Feb. 2, 1965　　　　M. A. POUND　　　　3,168,015
INFLATING DEVICES FOR VEHICLE TIRES
Filed May 27, 1963
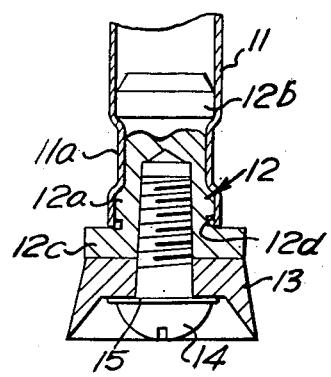
INVENTOR:
Maurice A. Pound
BY
Bierman & Bierman
Attorneys 3,168,015
INFLATING DEVICES FOR VEHICLE TIRES
Maurice Albert Pound, Wollaton, Nottingham, England, assignor to Raleigh Industries Limited, a company of Great Britain, Northern Ireland and the Isle of Man
Filed May 27, 1963, Ser. No. 283,182
Claims priority, application Great Britain, May 30, 1962, 20,765
4 Claims. (Cl. 92—245)

The invention concerns inflators of the kind used for the inflation of cycle and like tyres and is particularly concerned with plunger rod assemblies therefor.

In conventional inflator assemblies it is common practice to secure the piston or washer to the plunger rod by the engagement of a screw passing centrally through the washer with a nut located within and secured to the end of the said rod.

Whilst in general the manner of mounting the washer is satisfactory and has been widely practised for many years, it is open to criticism in that there is a very real tendency for the screw to become, in usage, loose and, in due course, for the washer to become detached from the plunger rod. The separation of the washer from the rod is not in itself sufficient to justify the scrapping of the inflator since the parts may be reassembled with no great difficulty, but periodic re-assembly, albeit at appreciable intervals of time, is inconvenient and preferably should be avoided.

It is among the objects of the present invention to provide an improved inflator plunger assembly.

Thus according to the present invention an inflator plunger assembly for a cycle tyre or like inflator comprises a plunger rod, a resilient deformable plug in engagement with the end of said rod and adapted to be retained in such engagement, and a washer secured to the said plug by a self tapping screw or like formation.

The invention will now be described further, by way of example only, with reference to the single figure of the accompanying drawing which illustrates in cross section, a plunger end assembly.

Referring now to the drawing a plunger assembly for a cycle inflator comprises a plunger rod 11 having a plug 12 in engagement with the end thereof and a piston or washer 13 secured to such plug 12 by a self tapping screw 14.

The plug 12 is of a resiliently deformable plastic material, for example polyvinyl chloride, and comprises a shank portion 12a having a head portion 12b at one end thereof and a radial flange 12c at the other end thereof, the head portion 12b being of greater diameter than the shank portion 12a. The head portion 12b is a close but free fit within the bore 11a of the rod 11 whilst the flange 12c greatly exceeds the outside diameter of such rod. A circumferential channel 12d is prvoided in the shank portion adjacent the flange 12c.

The washer 13 is of conventional type and is in the form of a leather cup, and it is a piston which reciprocates in a cylinder.

To assemble the parts the plug 12 is engaged with the end of the plunger rod 11 and is maintained in such position by a reduced diameter portion 11a of the rod 11, such portion 11a corresponding to the shank portion 12a of the plug. It is to be appreciated that the reduced diameter portion 11a may be formed before or after location of the plug in position, and in the former case the plug 12 will be pressed into position. The washer 13 is secured to the plug 12, and thus the plunger rod 11, by the engagement of the self tapping screw 14 with such plug, a steel washer 15 being positioned between the head of the screw 14 and the leather washer 13.

We have found in practice that such an arrangement as is proposed is satisfactory in operation and is less likely to become loose than are conventional assemblies.

The advantage of the plunger assembly according to the invention is thought to stem from the close retention of the screw by the plug, such feature arising from the resilient nature of the latter.

The invention is not restricted to the particular features of the embodiment hereinbefore described since alternatives will readily present themselves to one skilled in the art.

For example, it may be found desirable to provide a washer between the plug flange and the end face of the plunger rod to avoid wear to the said flange. Furthermore, the plug may be secured in position in the end of the rod other than by crimping or otherwise reducing the dimensions of plunger rod.

What I claim is:

1. An inflator plunger assembly comprising a hollow cylindrical plunger rod, a plug in the end of said rod, said plug being of resiliently deformable material, said plug having an integral radial flange of a diameter substantially greater than that of said rod, the lower face of said flange being flat, a washer having a flat upper face in contact with said lower face, a self tapping screw extending through said washer and into said plug, the end of said rod being in contact with the upper face of said flange.

2. An inflator assembly according to claim 1 characterized in that there is a central opening in said plug of lesser diameter than said screw to permit the latter to cut a thread in said plug.

3. An inflator assembly according to claim 1 characterized in that there is a circumferential channel in said plug at the junction thereof with said flange.

4. An inflator assembly according to claim 1 characterized in that the rod has a substantial length of lesser diameter than the plug, whereby said plug is gripped thereby and compressed.

References Cited by the Examiner
UNITED STATES PATENTS

| | | | |
|---|---|---|---|
| 2,584,926 | 2/52 | Roll | 92—245 |
| 2,678,248 | 5/54 | Peters | 92—240 |
| 3,062,601 | 11/62 | Sadler | 92—240 |
| 3,082,935 | 3/63 | Arak | 92—240 |

RICHARD B. WILKINSON, *Primary Examiner.*
KARL J. ALBRECHT, *Examiner.*